United States Patent [19]

Ikeda et al.

[11] 4,345,611
[45] Aug. 24, 1982

[54] SAFETY VALVE MEANS FOR BATTERY

[75] Inventors: Hironosuke Ikeda, Hirakata; Hisao Oishi, Kobe; Seiki Yoshida, Kakogawa, all of Japan

[73] Assignee: Sanyo Electric Co., Ltd., Moriguchi, Japan

[21] Appl. No.: 156,512

[22] Filed: Jun. 4, 1980

[30] Foreign Application Priority Data

Jun. 7, 1979 [JP] Japan .................................. 54-77862
Jul. 4, 1979 [JP] Japan .................................. 54-92657

[51] Int. Cl.³ .............................................. F16K 13/04
[52] U.S. Cl. .................................... 137/68 R; 137/69; 220/89 A
[58] Field of Search ................... 137/68 R, 68 A, 69, 137/70, 71; 220/89 A

[56] References Cited

U.S. PATENT DOCUMENTS

| | | | |
|---|---|---|---|
| 3,155,271 | 11/1964 | Summers | 137/71 X |
| 3,698,598 | 10/1972 | Wood | 137/68 R |
| 3,845,878 | 11/1974 | Carlson | 137/68 R X |
| 3,881,629 | 5/1975 | Shaw | 220/89 A |
| 4,079,854 | 3/1978 | Shaw | 137/68 R X |

FOREIGN PATENT DOCUMENTS 951101 3/1964 United Kingdom ............. 137/68 R

*Primary Examiner*—Harold W. Weakley
*Attorney, Agent, or Firm*—Darby & Darby

[57] ABSTRACT

The present application discloses a safety valve means for battery comprising a lid plate having therein a valve hole, a thin plate overlapped on the lid plate for closing the valve hole, a terminal plate in the reverse dish shape overlapped on the thin plate and having a gas removing hole and a downwardly projected cutter means and forming a valve chamber together with the thin plate, a holding means for holding the periphery of the thin plate between the lid plate and the terminal plate by caulking the turning edge of the lid plate or the terminal plate and an annular resilient member disposed between the thin plate and the terminal plate and pressed by the terminal plate to press the thin plate.

According to safety valve means for battery of the present invention, when the periphery of the thin plate is held by and between the lid plate and the terminal plate, holding pressure is adapted to be adsorbed by the annular resilient member, thereby to restrain the occurrence of bent of the thin plate which is otherwise resulted from the holding pressure above-mentioned. Therefore, the thin plate may be located at a predetermined position, whereby a highly reliable safety valve having high precision may be obtained.

Furthermore, it is possible to maintain strong sticking of the lid plate to the thin plate.

Moreover, in the valve chamber the annular resilient member is disposed between the thin plate and terminal plate in a compressed manner, thereby to prevent the electrolyte from leaking along the abutment surfaces of the annular resilient member and the terminal plate.

7 Claims, 7 Drawing Figures

SAFETY VALVE MEANS FOR BATTERY

FIELD OF THE INVENTION

The present invention relates to a safety valve means for a battery in which, if the inner pressure within the battery is increased due to an internal short-circuit or the like, a thin plate disposed for hermetically sealing the battery is adapted to be bent so as to come in contact with a cutter means and is then broken, so that gas within the battery is discharged to the air, thereby preventing the battery from being ruptured.

BACKGROUND OF THE INVENTION

A conventional safety valve means for a battery is constructed as shown in FIG. 1.

In FIG. 1, a lid plate 2 has therein a valve hole 1 and a thin seal plate 3 overlaps the lid plate 2 for covering the valve hole 1. A terminal plate 4 is formed in a reverse dish shape and overlaps on the thin plate 3. A turned edge 5 at the periphery of the lid plate 2 is bent so that the peripheral edge of the thin plate 3 is held between the lid plate 2 and the terminal plate 4.

The terminal plate 4 has therein a gas removing hole 6 and a portion of the terminal plate 4 is downwardly turned to form a cutter means 7. The thin plate 3 and the terminal plate 4 constitute a valve chamber 8. The lid plate 2, the thin plate 3 and the terminal plate 4 constitute a closure cover 9.

The closure cover 9 is inserted, through insulating packing 12, into the opening of an outer case 11 incorporating an electrode assembly 10. The opening edge 13 of the outer case 11 is inwardly turned so that the closure cover 9 is mounted to the outer case 11 in an air- and liquid-tight manner.

In assembling the closure cover 9 of such conventional structure, i.e. when the peripheral turned edge 5 of the lid plate 2 is bent, there the thin plate 3 is upwardly bent at the center portion thereof as shown in FIG. 1, due to bending pressure. This may cause the thin plate 3 to come in contact with the cutter means 7, so that the thin plate 3 is broken. On the other hand, even if the thin plate 3 does not come in contact with the cutter means 7 during the assembly, the swelling of the thin plate 3 due to bending of the thin plate 3 may cause it to come in contact with the cutter means 7 and be broken before the gas pressure in the battery reaches the predetermined value.

Furthermore, since bending conditions of thin plates are not uniform in conventional batteries, the gas pressure to cause the thin plates to be broken is not constant and predictable.

Thus, such conventional safety valve means lacks reliability.

DISCLOSURE OF THE INVENTION

The present invention discloses a safety valve means for a battery having improved precision and reliability. It includes a lid plate having therein a valve hole, and a thin plate overlapping the lid plate for closing the valve hole. A terminal plate if reverse dish shape overlaps the thin plate and has therein a gas removing hole and a downwardly projected cutter means that form a valve chamber together with the thin plate. There are also holding means for holding the periphery of the thin plate between the lid plate and the terminal plate by bending the turned edge of the lid plate or the terminal plate, and an annular resilient member disposed between the thin plate and the terminal plate. This annular resilient member is pressed by the terminal plate against the thin plate to prevent the bowing out of the thin plate as with prior devices.

BRIEF DESCRIPTION OF THE DRAWINGS

The invention will be further described by way of example, with reference to the accompanying drawings in which.

DETAILED DESCRIPTION OF PREFERRED EMBODIMENTS

Figure 1:
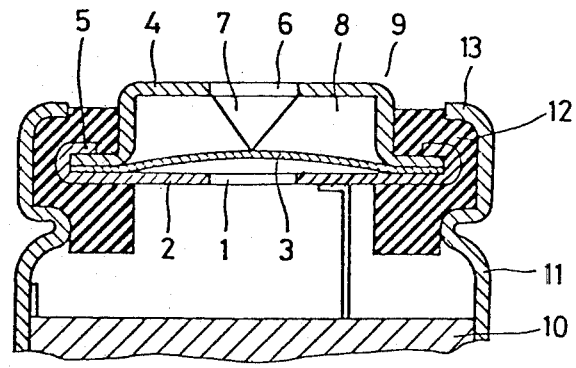
FIG. 1 is a sectional view of a conventional safety valve means for a battery.

The description hereinafter will discuss a first embodiment of a safety valve means for a battery in accordance with the present invention, with reference to FIGS. 2 and 3.

A metallic lid plate 14 has a valve hole 15 at the center portion thereof. A turned edge 16 is formed by turning upwardly the periphery of the lid plate 14. A thin seal plate 17, made of a synthetic resin plate, or a metallic plate is overlapped on the lid plate 14 to cover the valve hole 15. A metallic terminal plate 18 formed in a reverse dish shape is overlapped on the thin plate 17. A gas removing hole 19 is formed in the terminal plate 18 at the center portion thereof. The terminal plate 18 has a cutter means 20 which is formed by downwardly turning a portion cut out from the terminal plate 18. A valve chamber 21 is formed by the lid plate 14 and the terminal plate 18. An annular resilient member 22 is fitted into the concave portion of the terminal plate 18.

When the turned edge 16 of the lid plate 14 is inwardly bent the thin plate 17 is pressed by the annular resilient member 22 which in turn is pressed by terminal plate 18. The thin plate 17 is held by and between the periphery of the lid plate 14 and the periphery of the terminal plate 18. Thus, a closure cover 23 is formed by the lid plate 14, the thin plate 17, the terminal plate 18 and the annular resilient member 22.

The closure cover 23 is fitted, through insulating packing 26, into the opening of an outer case 25 that incorporates an electrode assembly 24. The opening edge 27 of the outer case 25 is inwardly turned, so that the closure cover 23 is mounted to the outer case 25 in an air-tight and liquid-tight manner.

With such arrangement, one electrode of the electrode assembly 24 is electrically connected to the outer case 25, and the other electrode of the electrode assembly 24 is electrically connected to the terminal plate 18 through a conductor member 28 and the lid plate 14.

The description will now discuss the operation of the safety valve means above-mentioned.

Figure 2:
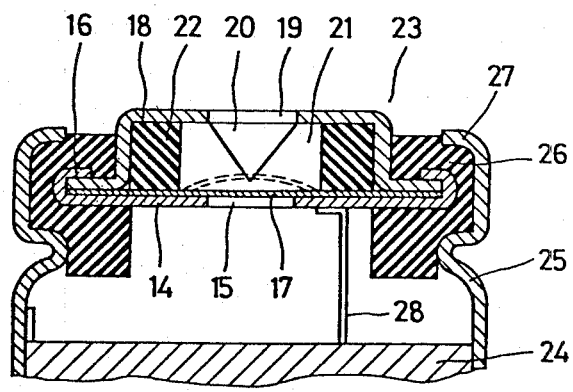
FIG. 2 is a sectional view of a first embodiment of a safety valve means for a battery in accordance with the present invention.
Figure 3:
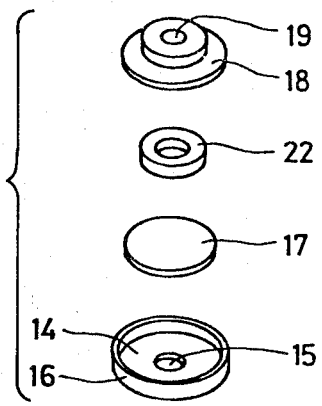
FIG. 3 is a disassembled perspective view of the closure cover in FIG. 2.

If gas pressure in a battery is increased due to a short-circuit or the like within the battery, the thin plate 17 is adapted to be upwardly bent as shown by broken lines in FIG. 2. When such gas pressure reaches a predetermined value, the thin plate 17 comes in contact with the cutter means 20. The thin plate 17 is then broken, so that the gas in the battery is discharged to the air from the gas removing hole 19 through the valve hole 15 and the valve chamber 21, thereby preventing the battery from being ruptured.

At the time of assembling the closure cover 23 in the embodiment shown in FIG. 2, i.e. when the turned edge 16 of the lid plate 14 is bent, pressure generated during this bending operation may be absorbed by the annular resilient member 22, since the thin plate 17 is pressed by the annular resilient member 22 which in turn is pressed by the terminal plate 18. As the result, a occurrence of bent of the thin plate 17 which is resulted from the pressure above-mentioned, may be restrained. Consequently, the thin plate 17 may be located at a predetermined position, so that a highly reliable safety valve may be provided.

Furthermore, firm contact of the lid plate 14 to the thin plate 17 may be maintained.

Moreover, since the annular resilient member 22 is disposed in a compressed manner between the thin plate 17 and the terminal plate 18, it is possible to prevent the electrolyte from leaking along the abutment surfaces of the annular resilient member 22 and the terminal plate 18.

The description hereinafter will discuss other examples of the thin plate, with reference to FIGS. 4 and 5.

Figure 4:
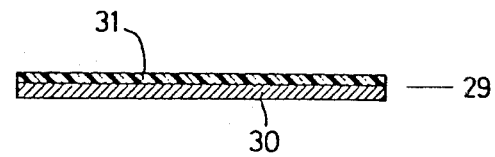
FIG. 4 is a sectional view of another example of the thin plate in FIG. 2.

In FIG. 4, a thin seal plate 29 is made of composite material comprising a metallic layer 30 and a synthetic resin layer 31 formed thereon.

Figure 5:
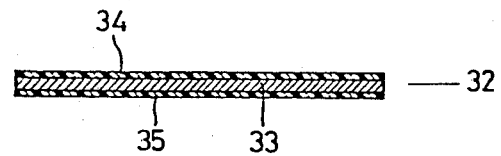
FIG. 5 is a sectional view of a further example of the thin plate in FIG. 2.

In FIG. 5, a thin seal plate 32 is made of composite material comprising a metallic layer 33 and synthetic resin layers 34 and 35 formed on and below the metallic layer 33.

For such metallic layer 30 or 33, a resilient metallic thin plate made of, for example, aluminium or stainless steel may be used.

The thin plate 29 shown in FIG. 4 is formed by fastening a metallic thin plate and a synthetic resin thin plate together with adhesive having an anti-electrolyte property.

The thin plate 32 shown in FIG. 5 is a metallic lamination formed by coating a synthetic resin, such as polyethylene and polypropylene, on a metallic thin plate.

The number of laminated metallic and synthetic resin layers is not limited to 2 or 3 as in the case mentioned earlier, but may be 4 or more as far so long as such laminated layers are securely cut with the cutter means 20 when gas pressure in the battery reaches a predetermined value.

When the thin seal plate is made of composite material comprising a metallic layer and synthetic layers as shown in FIGS. 4 and 5, such a thin plate may completely prevent gas or moisture contained in the air which enters the valve chamber 21 through the gas removing hole 19 in the terminal plate 18, from entering into the inside of the battery. Furthermore, the synthetic layer or layers may provide strong adhering of such a thin plate to the lid plate 14 and the terminal plate 18, thereby preventing the electrolyte from leaking along the abutment surfaces of these plates 14, 17 and 18.

The description hereinafter will discuss a second embodiment of the safety valve means for a battery in accordance with the present invention, with reference to FIGS. 6 and 7.

In this second embodiment, like parts are designated by like numerals used in FIG. 2.

Figure 6:
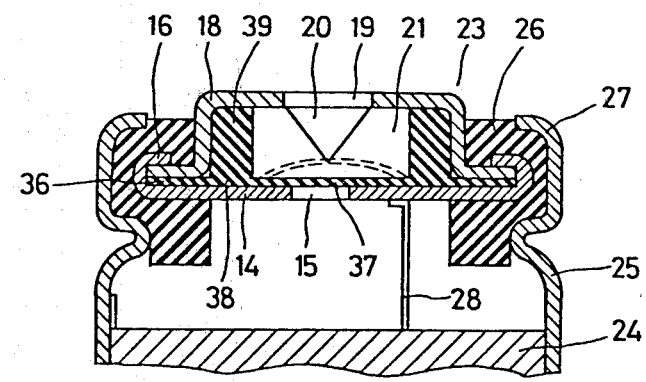
FIG. 6 is a sectional view of a second embodiment of a safety valve means for a battery in accordance with the present invention.

The second embodiment is different from the first embodiment in that the thin seal plate 17 and the annular resilient member 22 in FIG. 2 are integrally constructed with each other in FIG. 6.

In FIG. 6, a thin plate 38 comprises a flange 36 to be held by and between a lid plate 14 and a terminal plate 18, and a thin layer portion 37 for closing a valve hole 15. An annular resilient member 39 is formed on and integrally with the thin plate 38, and this annular resilient member 39 and the seal plate 38 are made of, for example, a polypropylene resin.

Figure 7:
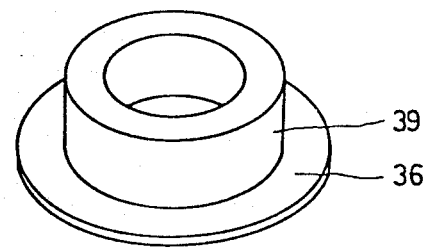
FIG. 7 is a perspective view of a portion of the second embodiment of FIG. 6.

Such a safety valve means shown in FIGS. 6 and 7 will perform the relief operation in the same way as that of the first embodiment shown in FIG. 2.

INDUSTRIAL UTILITY

According to the present invention a safety valve means for a battery having its periphery of the thin plate is held between the lid plate and the terminal plate by the holding means, may have the holding pressure absorbed by an annular resilient member, thereby restraining the occurrence of a bend in the thin plate which would otherwise result from such pressure. Consequently, the thin plate may be located at a predetermined position for puncture at a predetermined pressure, whereby a highly reliable safety valve having high precision may be provided.

Furthermore, it is possible to maintain strong adhesion of the lid plate to the thin plate.

Moreover, since the annular resilient member is disposed in a compressed manner between the thin plate and the terminal plate in the valve chamber, it is possible to prevent the electrolyte from leaking along the abutment surfaces of the annular resilient member and the terminal plate.

What we claim is:

1. A safety valve means for sealing an end of a battery casing comprising:
    a lid plate having therein a valve hole,
    a thin plate overlying said lid plate for covering said valve hole,
    a terminal plate of reverse disk shape supported by said lid plate and having a gas vent and a cutter means projecting toward said thin plate in the area of said valve hole, the peripheries of said lid plate, thin plate and terminal plate overlying each other to form a multi-layer peripheral portion, said terminal plate forming a valve chamber together with said thin plate,
    means for holding the periphery of said thin plate between the peripheries of said lid plate and said terminal plate by turning over an outer edge of said lid plate or said terminal plate, and
    a separate annular resilient member having a small center opening disposed between said thin plate and said terminal plate, and located with its principal portion within said reverse disk shaped portion of said terminal plate and interior to said multi-layer peripheral portion, said resilient member being pressed by said terminal plate so as to press said thin plate toward said lid plate such that the portion of said thin plate which is located interior to said peripheral portion is supported against bowing in the region between said lid plate, annular resilient member and said terminal plate.

2. A safety valve means for a battery as set forth in claim 1, wherein the holding means further comprises caulking at the respective peripheries of the thin plate, the terminal plate, with the turned peripheral edge of the lid plate.

3. A safety valve means for a battery as set forth in claim 1, wherein the thin plate is made of a synthetic resin plate.

4. A safety valve means for a battery as set forth in claim 1, wherein the thin plate is an electrically conductive metallic material.

5. A safety valve means for a battery as set forth in claim 1, wherein the thin plate is made of composite material comprising a layer of a metal and at least one synthetic resin layer.

6. A safety valve means for a battery as set forth in claim 5, wherein the thin plate is a metallic lamination.

7. A safety valve of claim 1, wherein said terminal plate includes a peripheral lip which rests on said thin plate, and said holding means comprises a turned peripheral edge of said lid plate which engages said peripheral lip of said terminal plate.

* * * * *